(12) United States Patent
Noe (10) Patent No.: US 10,856,544 B2
(45) Date of Patent: *Dec. 8, 2020

(54) DECOY TECHNOLOGY

(71) Applicant: Expedite International, Inc., Baldwin, WI (US)

(72) Inventor: Tim Noe, Baldwin, WI (US)

(73) Assignee: Expedite International, Inc., Baldwin, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/833,069

(22) Filed: Mar. 27, 2020

(65) Prior Publication Data

US 2020/0221688 A1 Jul. 16, 2020

Related U.S. Application Data (63) Continuation of application No. 15/160,075, filed on May 20, 2016, now Pat. No. 10,638,747.

(51) Int. Cl.
*A01M 31/06* (2006.01)
*G06F 13/38* (2006.01)
*G06F 13/40* (2006.01)

(52) U.S. Cl.
CPC .......... *A01M 31/06* (2013.01); *G06F 13/385* (2013.01); *G06F 13/4077* (2013.01)

(58) Field of Classification Search
CPC .................................................. A01M 31/06
USPC ........................................................ 43/2, 3
See application file for complete search history.

(56) References Cited

U.S. PATENT DOCUMENTS

| | | | |
|---|---|---|---|
| 6,408,559 B2 | 6/2002 | Mathews | |
| 6,442,884 B1 | 9/2002 | Sceery | |
| 7,043,865 B1 | 5/2006 | Crowe | |
| 8,188,691 B1 | 5/2012 | Twohig | |
| 2002/0178639 A1 | 12/2002 | Daniels | |
| 2005/0252066 A1 | 11/2005 | Couvillion | |
| 2010/0139146 A1 | 6/2010 | Elpi | |
| 2012/0227306 A1 | 9/2012 | Fong | |
| 2013/0239454 A1 | 9/2013 | Szechenyl | |
| 2015/0323123 A1 | 11/2015 | Gunn | |
| 2016/0198702 A1* | 7/2016 | Forrester | A01M 31/06 43/3 |
| 2016/0235053 A1 | 8/2016 | Koenck | |

* cited by examiner

*Primary Examiner* — Peter M Poon
*Assistant Examiner* — Danielle A Clerkley
(74) *Attorney, Agent, or Firm* — Skinner and Associates; Joel D. Skinner, Jr.

(57) ABSTRACT

A moving wing waterfowl or migratory bird decoy including a decoy body constructed of a predetermined material with exterior ornamentation to simulate a live waterfowl or migratory bird, the decoy body being arranged in a predetermined orientation to simulate a waterfowl or migratory bird, the decoy body having a top and a bottom. The decoy has at least one decoy wing connected to the decoy body, the decoy wing being constructed and arranged to simulate the wing of a waterfowl or migratory bird. The decoy body is constructed and arranged of a particular plastic material to hyper-realistically resemble a waterfowl or migratory bird. The control and power module is plug and play software controllable. The decoy is mountable on a male type member post via a female type receptacle on the decoy body. The decoy has a biased stabilizer cord that also mimics the legs of the waterfowl or migratory bird.

7 Claims, 13 Drawing Sheets

DECOY TECHNOLOGY

CROSS-REFERENCE TO RELATED APPLICATIONS, IF ANY

This application is a continuation of U.S. patent application Ser. No. 15/160,075, filed May 20, 2016, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to hunting systems, apparatus and methods. More particularly, the invention relates to a decoy apparatus and method. Most particularly, the invention relates to a spinning or flapping wing decoy that is constructed and arranged to realistically resemble a waterfowl or other migrating bird, such as a duck, that has a removable control and power module which is disposed on the bottom of the decoy, which is plug and play electronic controllable, which is mountable on a post via a female type receptacle, and which has a biased stabilizer that also mimics the legs of the duck.

2. Background Information

Decoys have been used for centuries to imitate an animal such as a bird for the purpose of attracting other birds or animals to a particular location for hunting or other purposes. Modern waterfowl decoys come in many types, including floating, ground placed, and stake or base mounted. Decoy bodies may have fixed wings or movable wings. Movable wings may be spinning, flapping or the like. And movable wings may be actuated by motor power, by wind, or by other forces. Many waterfowl decoys are constructed of inexpensive plastic materials.

Existing decoys are believed to have significant limitations and shortcomings. One problem for motorized moving wing decoys is that the power and motor mechanisms disposed inside decoy bodies are accessed through a cover or door placed on the top of the decoy body. This exposes the power and motor mechanisms to moisture from rain, other precipitation, wave action, and the like, and to dust and dirt in the environment. Another problem with top mounted access panels is that they present break lines that degrade the quality of the imitation body features of the decoy species. This is particularly a problem for bodies constructed of commonly used plastics. Commonly used plastics, although inexpensive to use, limit the quality of imitation ornamentation. Other problems exist with respect to mounting of decoys on stakes or other bases, and to inferior control mechanisms and features, particularly remote control features.

For these and other reasons, a need exists for the present invention.

All US patents and patent applications, and all other published documents mentioned anywhere in this application are hereby incorporated by reference in their entirety.

BRIEF SUMMARY

The present invention provides a waterfowl or migratory bird decoy for hunting purposes, and methods of manufacture and use therefore, which are practical, effective, reliable, and efficient, and which are believed to fulfill a need and to constitute an improvement over the background technology.

In one aspect, the invention relates to a spinning or flapping wing decoy including a body constructed and arranged to realistically resemble a waterfowl or migratory bird, such as a duck; that includes a removable control and power module which is disposed on the bottom of the decoy, which is plug and play electronic or software controllable, which is mountable on a post via a female type receptacle, and which has a biased stabilizer that also mimics the legs of the waterfowl or migratory bird.

In another aspect, the invention provides a decoy set comprising.
  a decoy; and
  a decoy base adapted to be placed on an environmental surface, the decoy base adapted to hold the decoy in a predetermined position, the decoy being connectible and disconnectible from the decoy base;
  the decoy including
    a decoy body constructed of a predetermined material with exterior ornamentation to simulate a live waterfowl or migratory bird, the decoy body being arranged in a predetermined orientation to simulate a such animal, the decoy body having a top and a bottom,
    at least one decoy wing connected to the decoy body, the decoy wing being constructed and arranged to simulate the wing of a waterfowl or migratory bird, and
    a power and control module, the power and control module being connectible and disconnectible from the bottom of the decoy body.

In a further aspect, the invention provides a water fowl decoy comprising,
  a decoy body constructed of a predetermined material with exterior ornamentation to simulate a waterfowl or migratory bird, the decoy body being arranged in a predetermined orientation to simulate such animal, the decoy body having a top and a bottom;
  at least one decoy wing connected to the decoy body, the decoy wing being constructed and arranged to simulate the wing of a waterfowl or migratory bird; and
  a power and control module, the power and control module being connectible and disconnectible from the bottom of the decoy body.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

DETAILED DESCRIPTION

Figure 1:
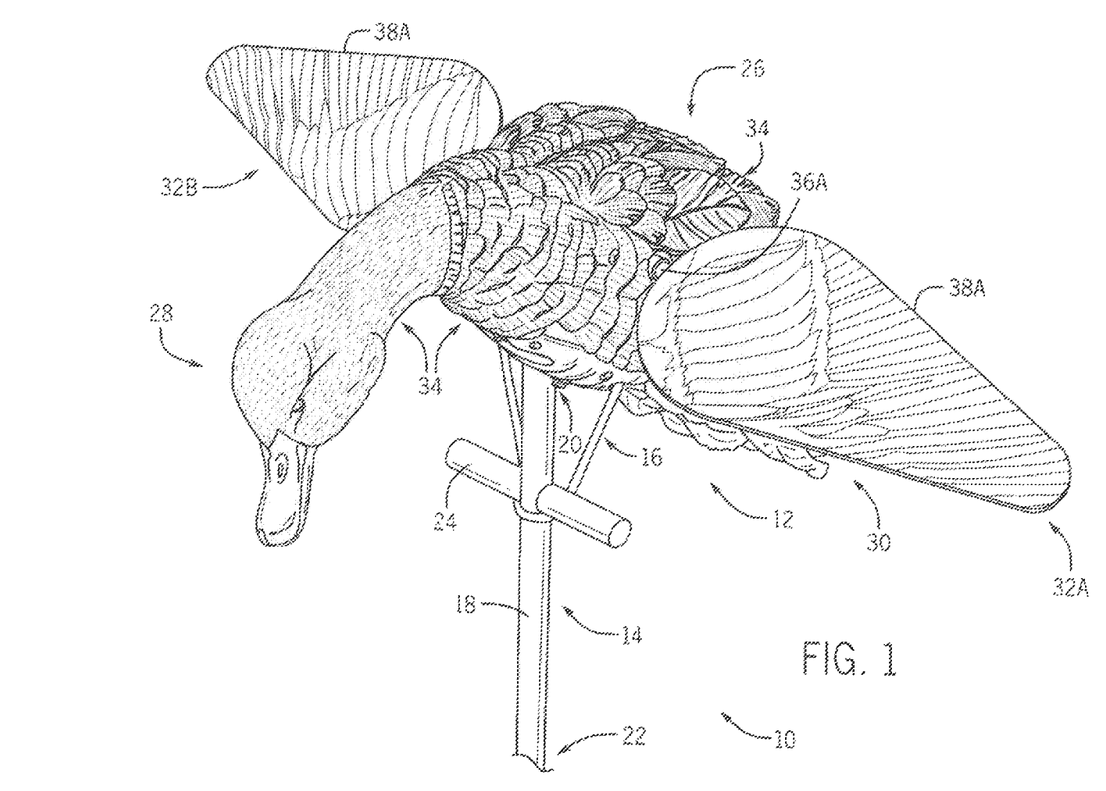
FIG. 1 is a perspective view, from the top, of an embodiment of the decoy of the present invention.
Figure 2:
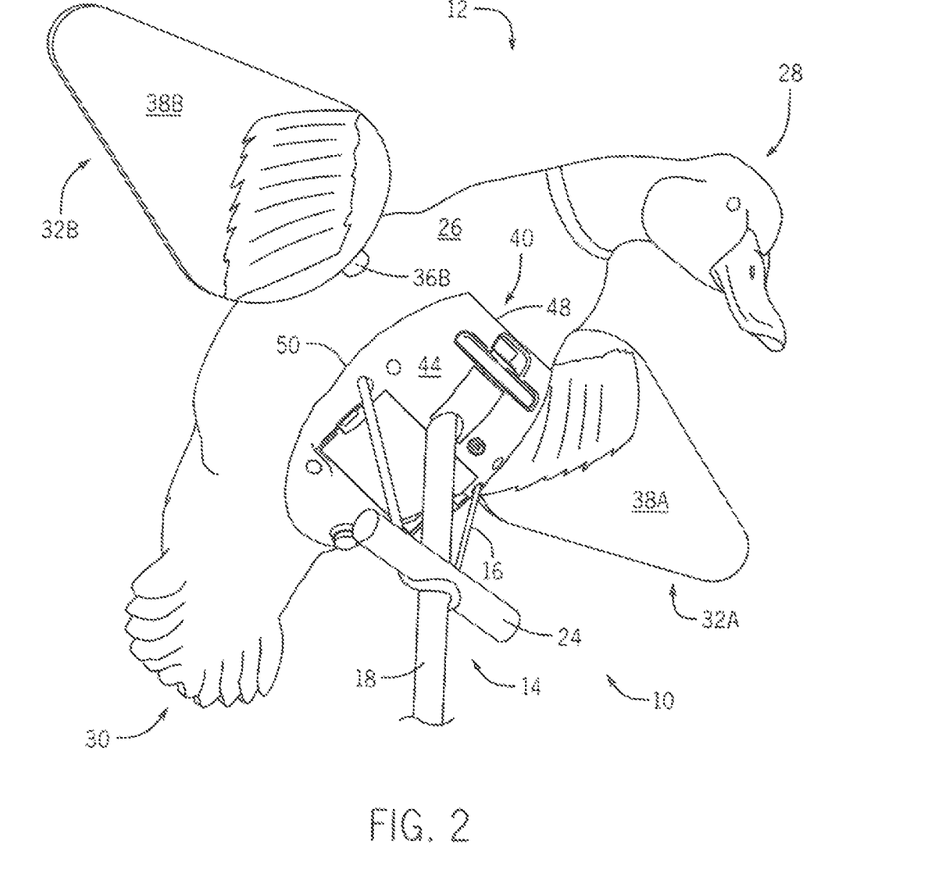
FIG. 2 is perspective view, from the bottom, of the decoy, without surface details applied to the decoy body.

Referring to FIGS. 1 and 2, one embodiment of the decoy set 10 of the invention includes a decoy 12 and a mounting base 14. The decoy 12 embodiment simulates a waterfowl or migratory bird, particularly in this embodiment, a duck (most particularly a mallard). The decoy 12 is coupled to the base 14 by a friction fit type, insert connection (female type in the decoy 12 and male type for the base 14) between the top of the base 14 and the bottom of the decoy 12. Preferably, the set 10 includes a stabilizer 16, most preferably a biased stabilizer cord. The embodiment of the base 14 is a post or stake which has a vertical member 18 with a top 20 and a bottom 22 and a horizontal member 24 that forms a T type configuration. The bottom end 22 may be configured as a spike to pierce the earth, for example the submerged bottom of a lake, pond, marsh or the like. The T type configuration forms a handle at the top of the base 24 to facilitate easier manual pushing during placement and pulling during removal by the user. In this embodiment, the vertical member 18 has a length of approximately 42 inches to permit the decoy 12 to extend above the surface of water so that the decoy 12 mimics the landing behavior of a duck on the surface of water. The vertical member may be mated with one or more extension members (not shown) to add length (up to 10 feet) for deeper water placement or otherwise changing the appearance of the landing pattern by the decoy 12. The horizontal member 24 has a length of about 5 inches in this embodiment and is disposed a predetermined distance from the top 20 of the vertical member to serve to engage the stabilizer 16 by wrapping as shown. The stabilizer 16 is preferably a bungee-type cord (preferably $\frac{1}{8}^{th}$ inch diameter) extending in a loop approximately 8 inches in length from the bottom of the decoy 12. In the preferred embodiment, the cord is orange color to simulate the color of the legs of a mallard duck. Other colors can be used depending upon the species and/or sex represented. Thus, the stabilizer 16 functions to hold the decoy 12 securely on the base 16 and also acts as part of the decoy simulation. Although the base 14 is shown and described as a stake type apparatus for mounting in earth, it is within the purview of the invention that the base could be constructed and arranged as a tri-pod or other configuration, provided that it has a T type top end with a male type top 20 connection for the decoy 12, a horizontal member for engaging the stabilizer 16.

Figure 4:
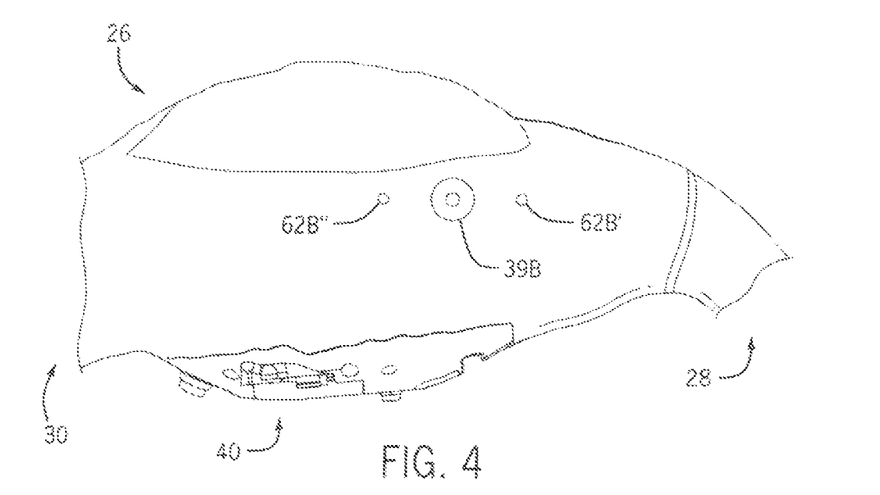
FIG. 4 is a side view of a center portion of the decoy body.
Figure 5:
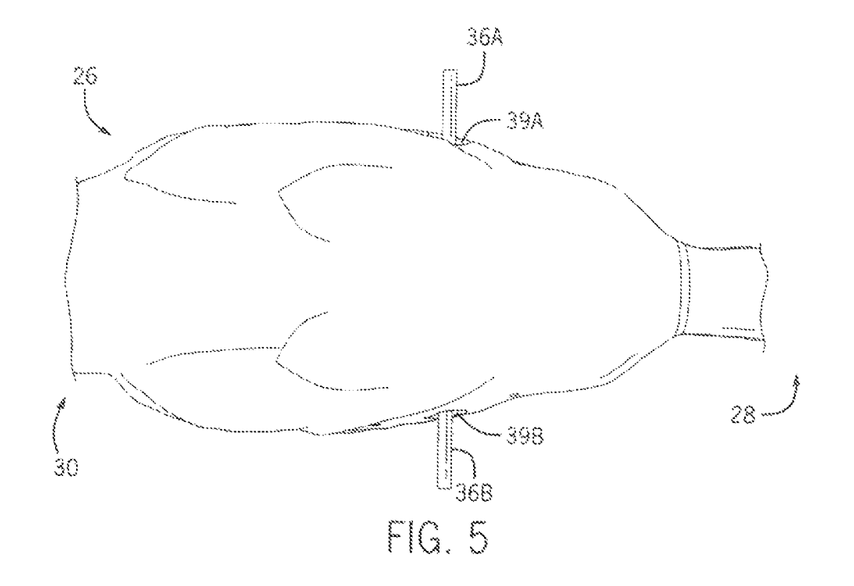
FIG. 5 is a top view of the center portion of the decoy body, again without surface details shown applied to the body.
Figure 7:
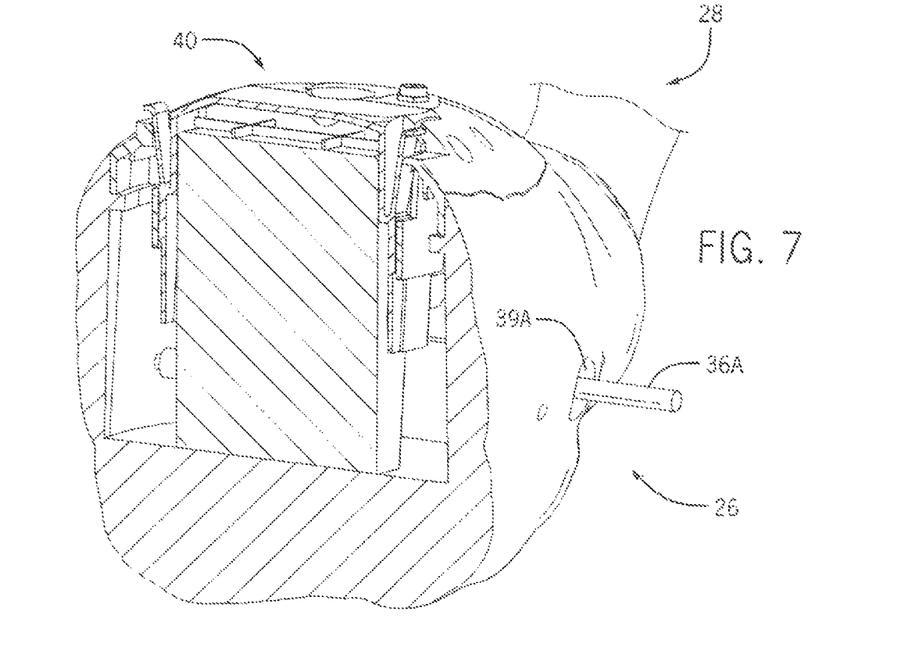
FIG. 7 is a lateral crossectional view of the decoy body, taken along line 7-7 of FIG. 6.

The decoy 12 includes a body 26 having a front head section 28 and rear tail section 30. A pair of wings 32 A and B are coupled, in use, to the body 26 and extend from the sides of the body 26. In the preferred embodiment, each wing 32 includes a shaft 36 A-B and a wing panel 38A-B. In this embodiment, the shafts 36 are constructed of steel. The wing panels 38 are preferably flat or planar and have printed ink graphics that simulate the pattern and color of a duck or other bird wing. The panels 38 have a curvilinear periphery of a predetermined configuration to simulate the outline of a duck wing, with a predetermined length (extending away from the body 26) and a predetermined width (from front to back). The shafts 36 are connectible and disconnectible to sleeves 72 or other adapters which are disposed in apertures 39 in the side of the body 26 as is shown in FIGS. 4, 5 and 7. Preferably, the wing shafts 36 are magnetically connectible to the sleeves 72 so that they are easily connected and disconnected. The sleeves 72 are connected to a motor 64 described below. Alternatively, it is within the purview of the invention that the shafts 36 may be connected to the body 26 (permanently or removably) and the wing panels 38 may be connectible to those shafts 36 directly by various connections.

The body 26 is preferably a unitary or one piece structure, but may be formed in interconnected parts (fixed or removable). Significantly, the body 26 is preferably constructed of Ethylene vinyl acetate (EVA) plastic material. This construction permits enhanced, detailed, 3-dimensional surface ornamentation 34 and color. The body 26 is configured in a downwardly arched condition to simulate a live waterfowl or migratory bird, such as a duck, in the act of landing on the surface of a water body such as a lake, pond, marsh, creek or the like. Other configurations are possible utilizing the teachings of the invention. In the embodiment shown, the body 26 has a total longitudinal length of about 28 inches from bill to tail (17 inches from tail to end of torso (beginning of neck)). The thickness or height of the body 26 torso is about 5 inches. The lateral width is about 6 inches at the middle of the back of the torso.

Figure 3:
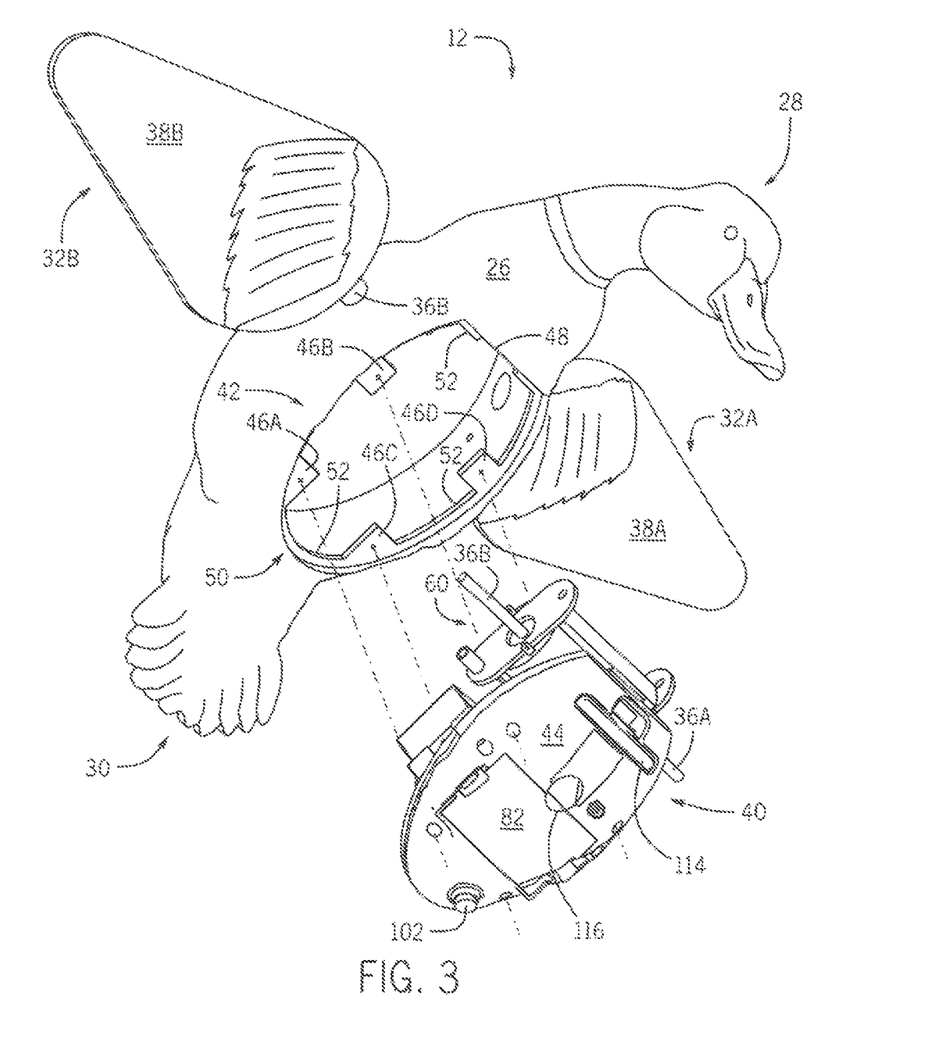
FIG. 3 is a view of the decoy from the bottom with a main module separated from the body of the decoy.
Figure 6:
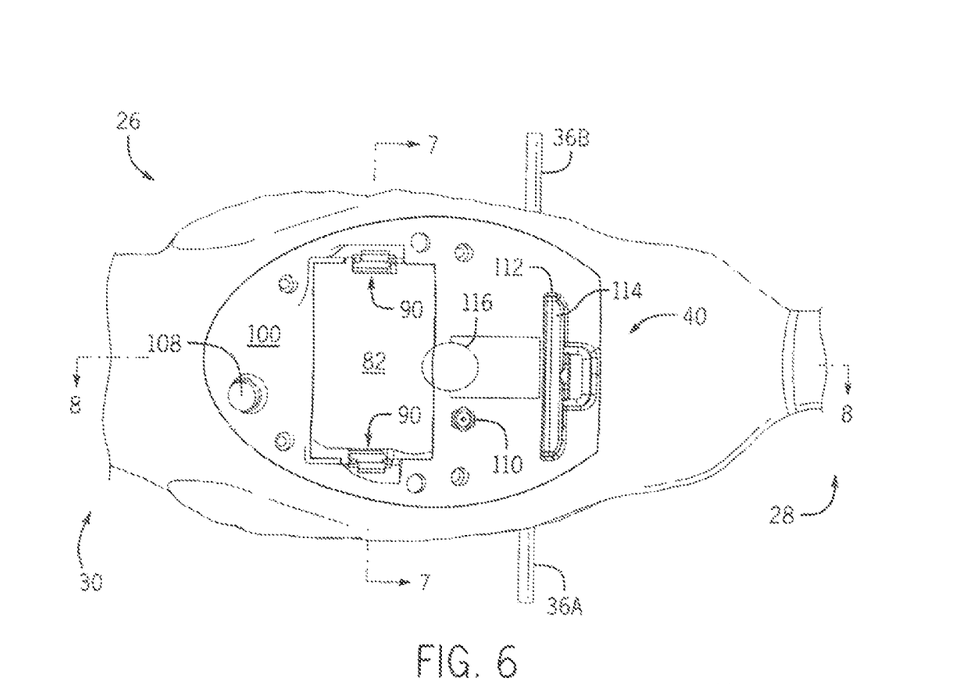
FIG. 6 is a bottom view of the center portion of the decoy body, wherein the main module is connected to the body.

Referring also to FIGS. 3 and 6, the body 26 has a removable main or power and control module 40 that when connected is disposed in lower body cavity 42. The main module 40 contains power and control elements of the decoy 12 described further below. The body cavity 42 has a predetermined dimensions and depth to accommodate the main module 40 so that its lower, exterior surface panel 44 is flush with the exterior surface of the body 26 when connected. The cavity 42 has four mounting areas 46A-D for fastening the module 40 preferably by screws. In the embodiment shown, the cavity 42 has a rectilinear front edge 48 and a curvilinear rear edge 50. The length (longitudinal axis) of the cavity is about 6 inches and the width is about 5 inches. The edges 48 and 50 and mounting areas 46 are inset from the exterior a predetermined distance forming a substantially continuous flange-type ridge 52 around the periphery of the cavity 42 opening. The top edge 54 of the module abuts this inset ridge 52 forming a water resistant connection. Significantly, grouping the power and control feature in a removable group as one unit, and disposing that unit at the bottom of the decoy, shields the features from elements such as water, moisture, dirt, dust, grease and the like so that they last longer, and also permits easy replacement of the features should a failure occur. Mounting the main module 40 on the bottom of the body 26 also permits more realistic surface ornamentation for the upper part of the body, which is the part of the decoy which is most visible to waterfowl such as ducks which are sought to be attracted by the user/hunter. Bottom placement of the module 40 also minimizes the existence of structural connection lines on the top, which again renders the appearance more life like.

Figure 8:
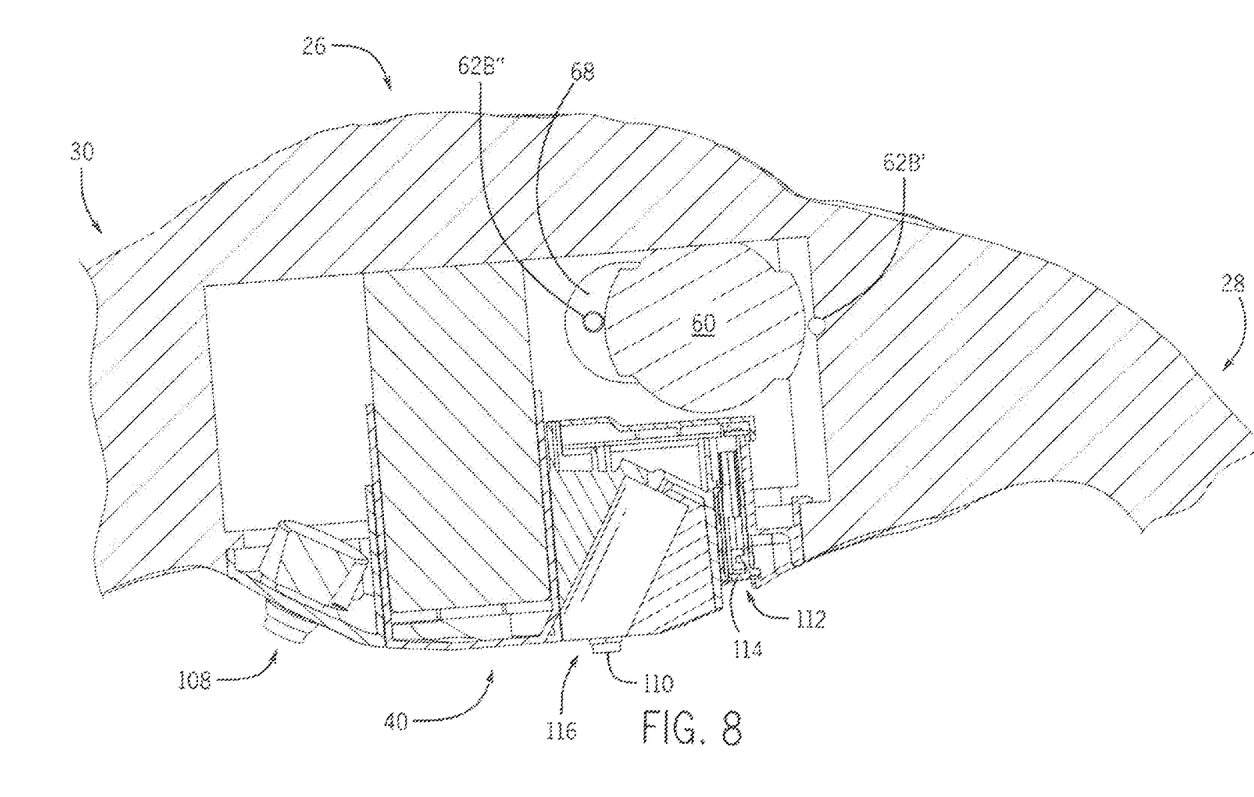
FIG. 8 is a longitudinal crossectional view of the decoy body, taken along line 8-8 of FIG. 6.
Figure 9:
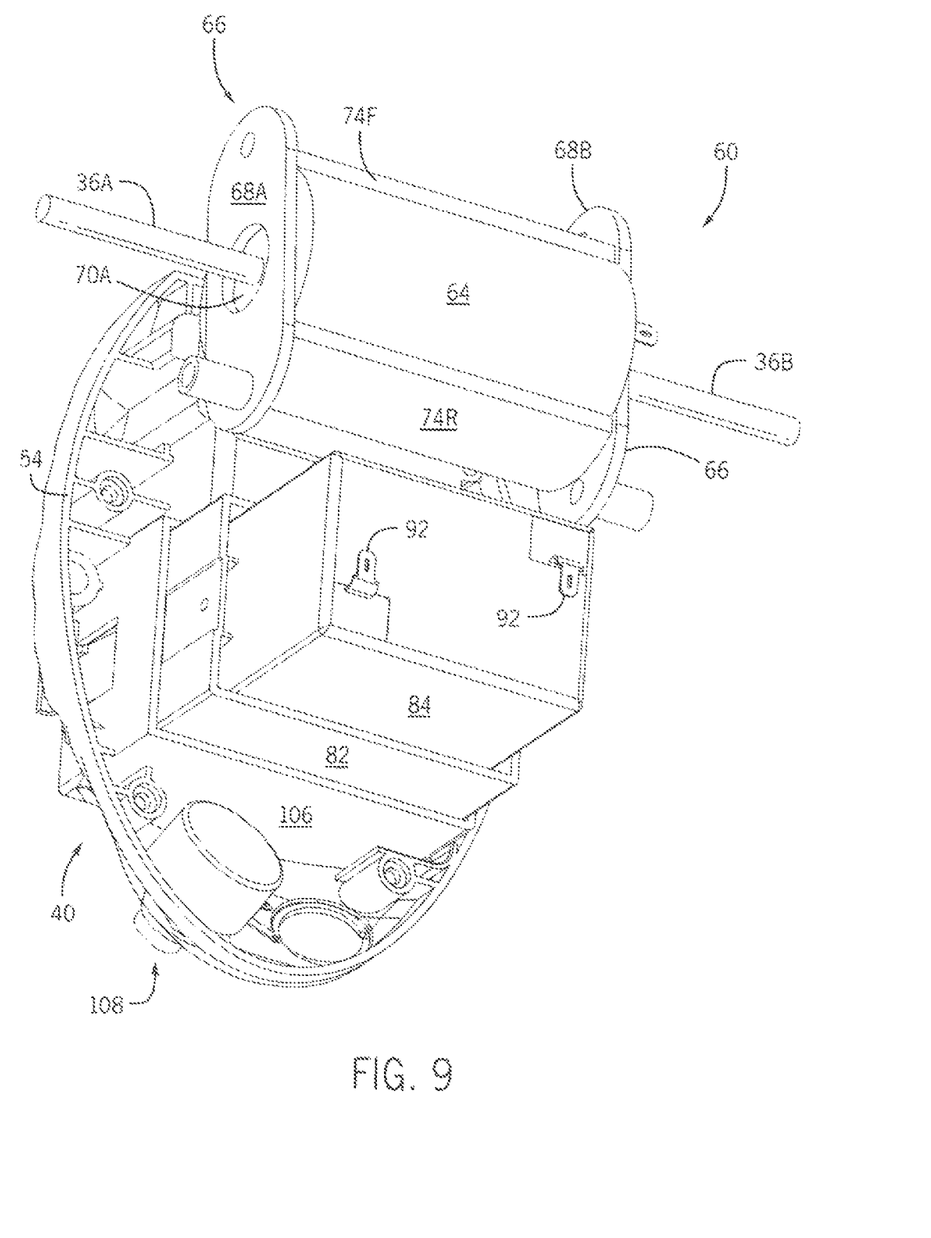
FIG. 9 is a perspective view, from the top (relative to when it is installed in the decoy) of an embodiment of the main module, separated from the decoy.
Figure 10:
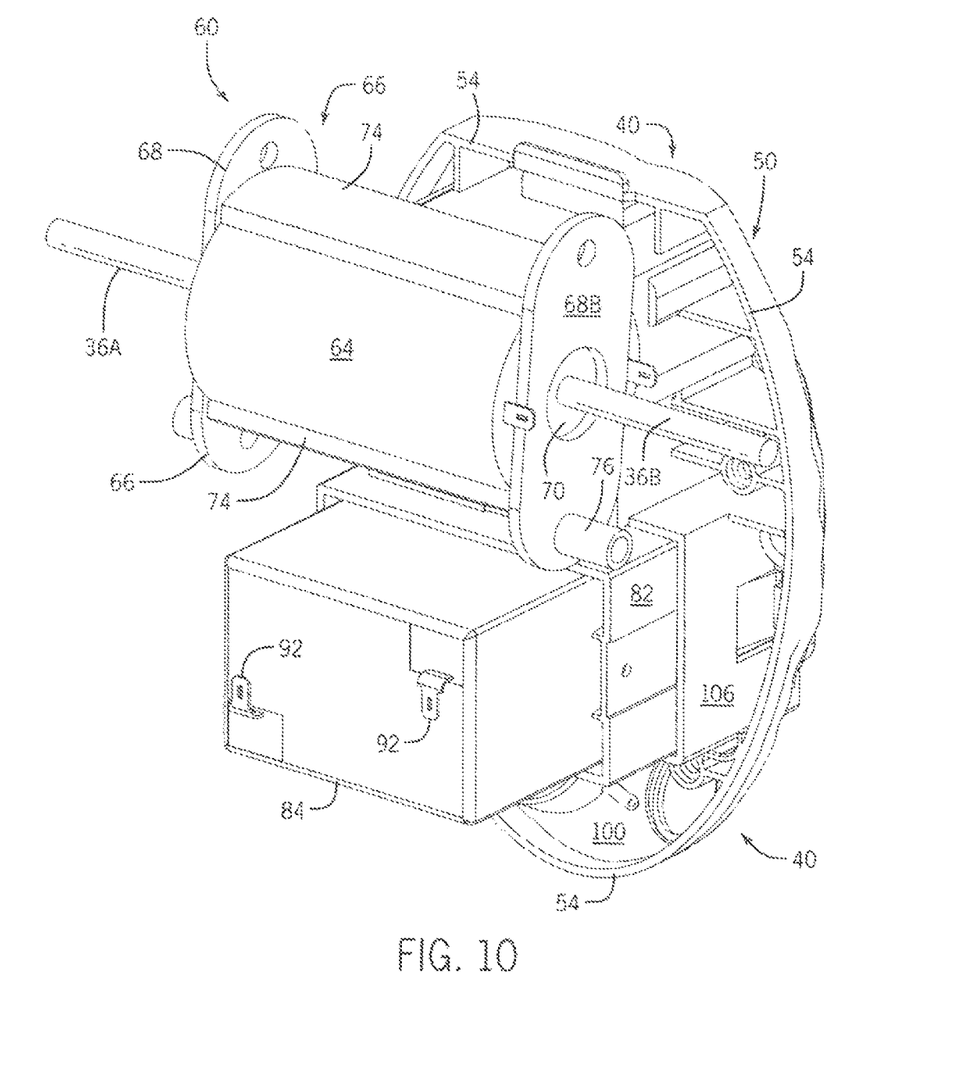
FIG. 10 is another perspective view of the main module.
Figure 11:
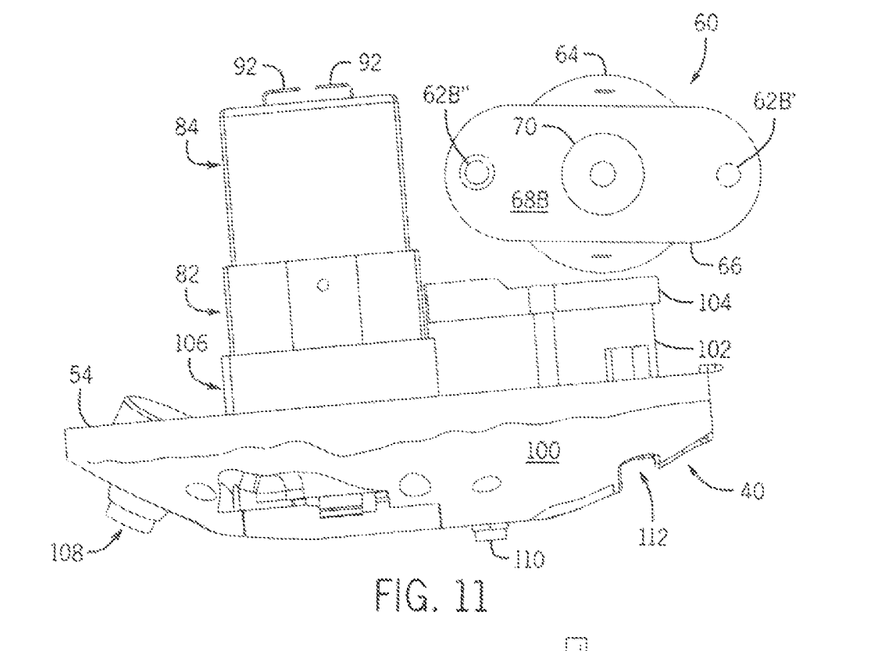
FIG. 11 is a side view of the main module.
Figure 12:
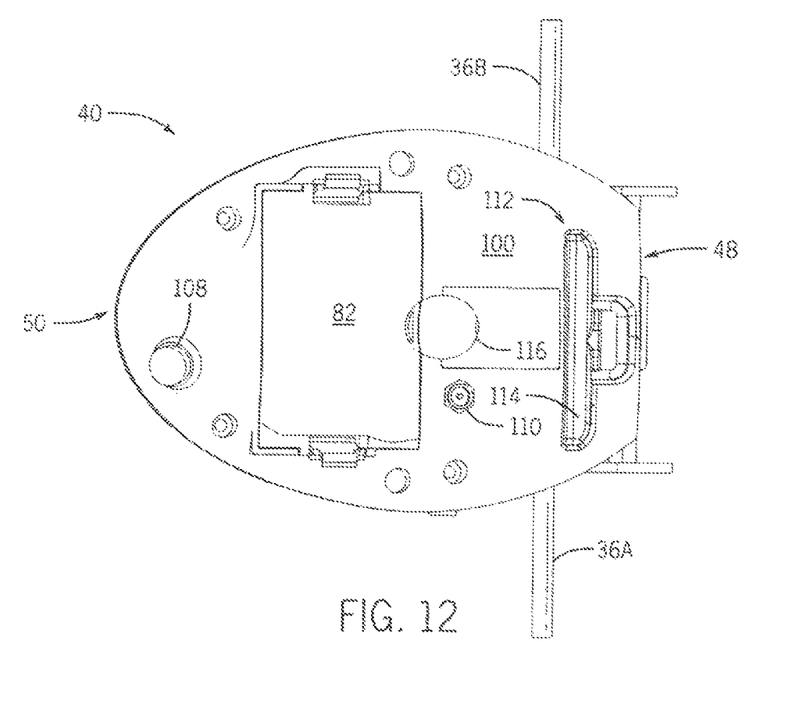
FIG. 12 is bottom view of the main module.
Figure 13:
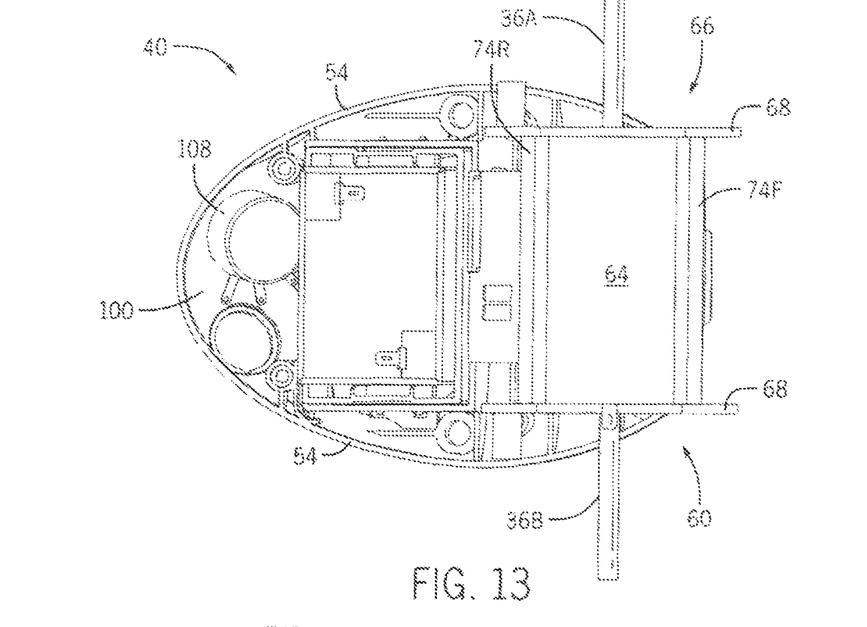
FIG. 13 is a top view (again, relative to when it is installed) of the main module.
Figure 14:
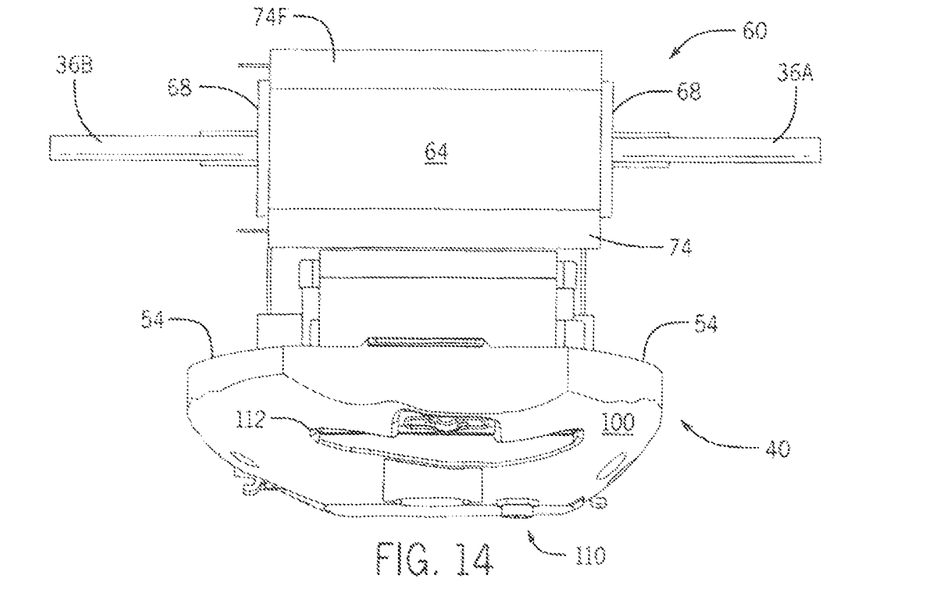
FIG. 14 is a front end (relative to when it is installed in the decoy) of the main module.
Figure 15:
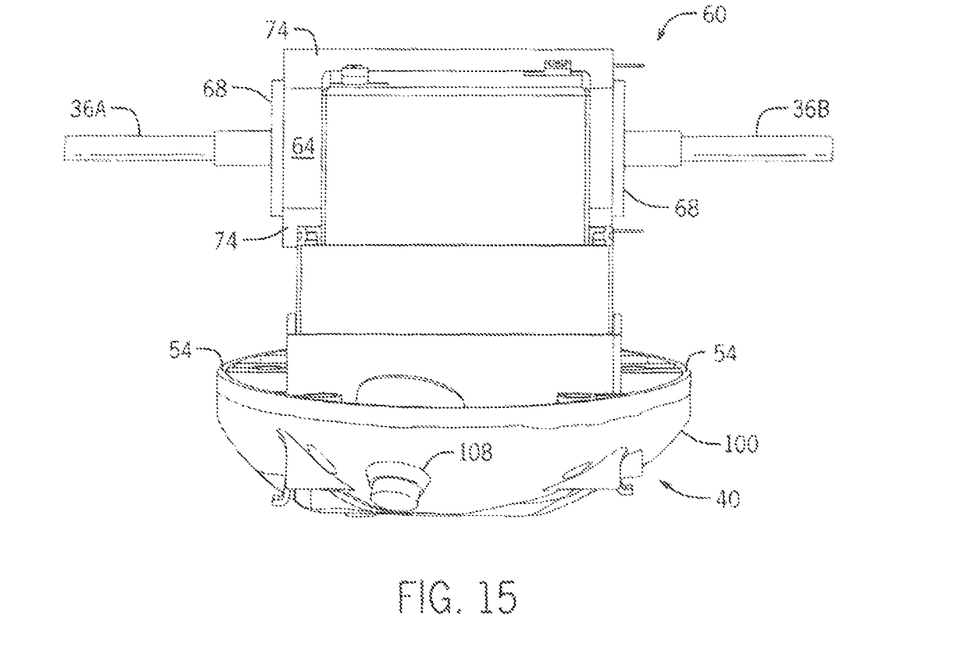
FIG. 15 is rear end of the decoy body.
Figure 16:
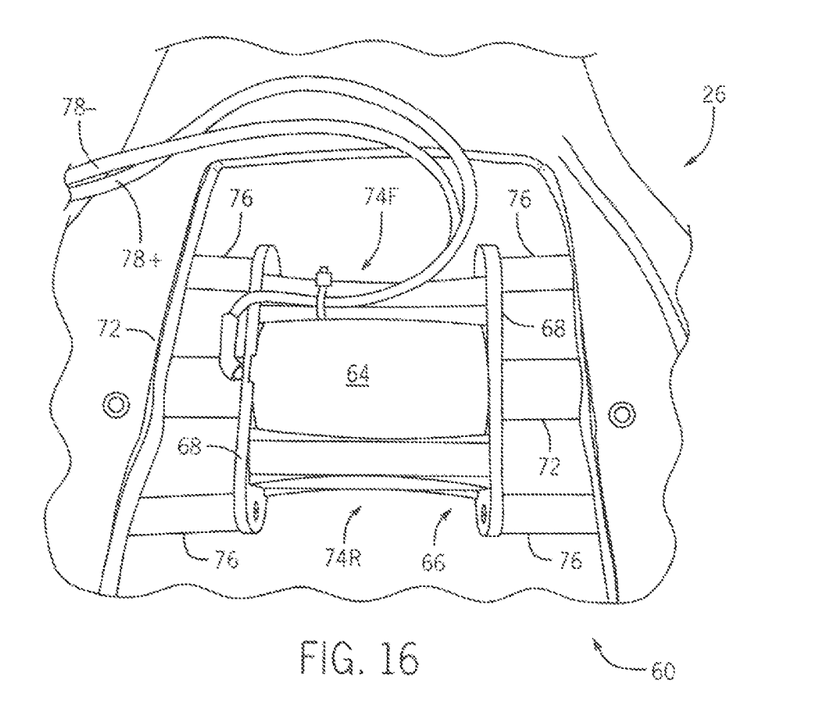
FIG. 16 illustrates the placement of an embodiment of the motor assembly in the body of the decoy.

FIGS. 9-11 and 13-15 show the motor assembly 60 of the decoy 26, which is disposed in the cavity 42 of the body 26 In the preferred embodiment, the motor assembly 60 is fixedly connected in the cavity 42 separate from the main module 40. As is shown in FIG. 11, and referring also to FIGS. 4, 8 and 16, in the preferred embodiment, the motor assembly 60 is fixedly connected to the body 26 via a set (prime and double prime) of two screws 62A-B on each side. The assembly 60 includes a DC motor (preferably 6 Volt, but alternatively a 12V) 64 supported by a mounting bracket 66. The mounting bracket 66 has a pair of side plates 68 A and B with apertures 70 A and B through which motor sleeves 72 A and B extend laterally out to the body apertures 39. Spacers 74 F and R connect the plates 68. Arms 76 extend laterally from the plates 68 for mating with the screws 62, preferably through apertures (not shown) in the body 26. The motor 64 has a pair of positive and negative power wires 78 + and −. It is within the purview of the invention that the motor assembly 60 may be constructed and arranged as part of the power and control module 40 and therefore removable from the body 26 FIGS. 9-11 and 13-15 illustrate the module 40 with the motor assembly 60 removed from its connection with the body 26.

Figure 17:
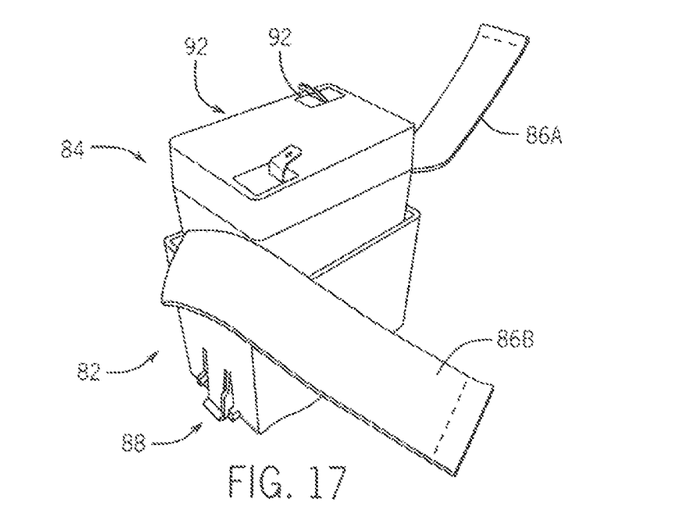
FIG. 17 illustrates an embodiment of a removable battery cradle and battery.
Figure 18:
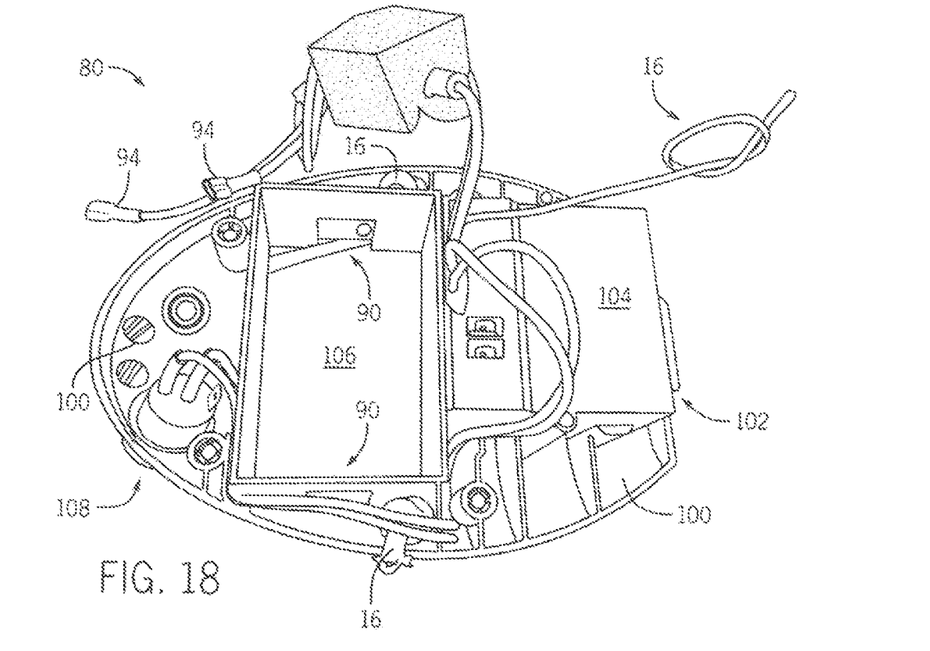
FIG. 18 illustrates an embodiment of the main module base.
Figure 19:
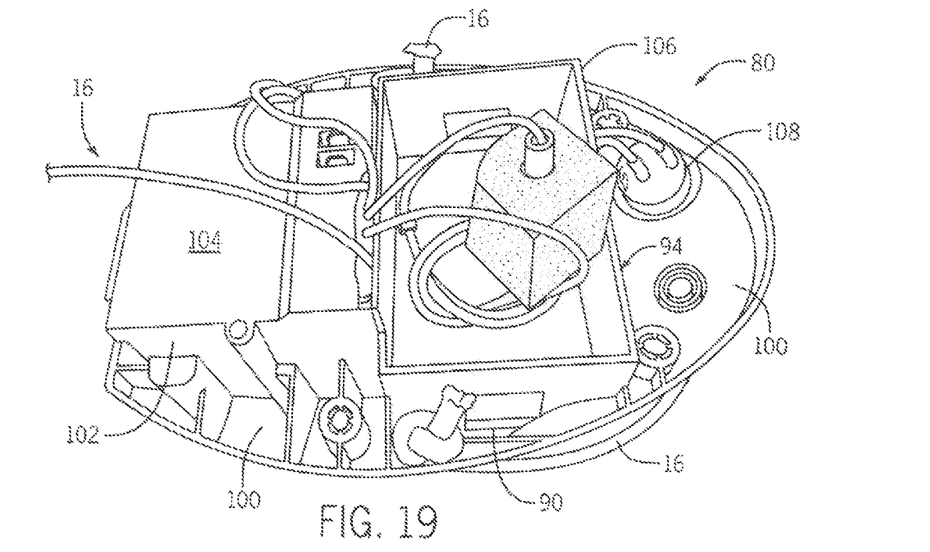
FIG. 19 illustrates the main module base.

Returning to the main module 40, and referring to FIGS. 17, 18 and 19, the module preferably consists of a base member 80 (shown separately in FIGS. 18 and 19), a battery cradle 82 and a battery 84. (shown separated from the module base in FIGS. 13-15). The battery 84 is a 6 Volt rechargeable battery in this embodiment. It has a pair of connectors 92 for mating with complementary mating wires 94 on the base member 80. The cradle 82 is a plastic box member with an open top to receive the battery 84. A pair of hook and loop type straps 86 A-B hold the battery 84 in place. The cradle 82 has snap connectors 88 for connection and disconnection with complementary connectors 90 on the base 80. The base member 80 includes a floor member 100, a controller housing 102 with a cover 104, a printed circuit board (PCB) control circuit (not shown) disposed in the housing 102, a battery cradle slot 106, an on/off switch 108, a recharger connection 110, a bay 112 for a removable USB plug, and a removable software plug 114 that is communicatively connected to the PCB control circuit. The software plug 114 contains additional software for receiving control signals, for example RF signals, from a remote control device, for example a hand held remote control (not shown). If remote control is not present, the plug 114 may configured as a dummy to simply complete a circuit back to the PCB control circuit. Antenna 116 is also connected to the control circuit PCB for remote control purposes in the presence of the remote control plug 114. The PCB control circuit contains hardware and software for controlling on/off, power, motor control and the like. Aperture 116 is for mating with the top end 20 of the decoy set 10 base 14

The main module 40 is connectible to the body 26 by aligning with the cavity 42 and actuating screws to complete the dirt and dust tight seal. It may be easily disconnected for cleaning, replacement or other maintenance by reversing these steps. The battery 84 is inserted into the battery cradle 82 using straps 86 and establishing electrical connections with the module 40. The battery cradle 82 mates with rectangular cradle slot 106 on the base member 80 and making snap connections. Removal of the cradle 82 from the module 40 and/or battery 84 from the cradle is easily and quickly accomplished, including in the field under common adverse hunting weather conditions and low or no light, reversing these steps. The insertable or removable control plug 12 has an electronic control means such as an electronic memory chip with instructions for motor control, remote control, or the like. It preferably has a USB type connection with the bay 112. The bay connector is then communicatively connected with the main control board disposed in the housing 102. The control board is communicatively connected to both battery 84 power and to the motor 64. The battery 84 is also communicatively connected to plug 110 for recharging via a standard AC to DC charger (not shown).

Although the decoy of the invention is described in terms of vertical, horizontal, transverse (lateral), longitudinal, and the like, it should be understood that variations from the absolute vertical, horizontal, transverse, and longitudinal are also within the scope of the present invention. Although the decoy body 24 has been described as being preferably constructed of EVA, it is possible apply many aspects of the invention to decoy bodies constructed of HDPE or a blend of plastics. Although the decoy 12 has been described in terms of a spinning type decoy, it is within the purview of the invention to construct and arrange a flapping, fixed, or other wing arrangement. The teachings of this invention are believed to be applicable to decoys for waterfowl such as ducks, geese and the like, migratory birds such as doves, pigeons, crows and the like, and to other bird species.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A powered spinning wing waterfowl or migratory bird decoy set comprising,
 a powered, spinning wing decoy;
 a decoy base post adapted to be placed on an environmental surface, the decoy base adapted to hold the decoy in a predetermined position, the decoy being connectible and disconnectible from the decoy base, the decoy base including a vertical member, and a connector disposed at the top of the decoy base;
 the decoy including,
  a decoy body constructed with exterior ornamentation to simulate a waterfowl or migratory bird, the decoy body being arranged in a predetermined orientation to stimulate a waterfowl or migratory bird, the decoy body having a top, a bottom, and an interior cavity, the interior cavity being open at the bottom to form an access cavity port,
  a pair of spinning decoy wings rotatably connected to the decoy body and extending laterally therefrom, each decoy wing including a shaft for connection to the decoy body and a wing panel which is constructed and arranged to simulate the wing of a waterfowl or migratory bird, each wing being connectible to the decoy body via a magnetic connection between the shaft and the decoy body;
  a motor assembly disposed in the interior cavity of the decoy body, the motor being communicatively coupleable to the shafts of the decoy wings, the motor assembly including a motor fixed to a motor mounting assembly, the motor being communicatively connected to a battery power and electronic control module, and disposed in the interior cavity of the decoy body;
  the battery power and electronic control module being connectible and disconnectible from the bottom of the decoy body at the access cavity port, the battery power and electronic control module including a battery communicatively connected to an electronic control circuit, the electronic control circuit further being communicatively connected to the motor assembly;
  the battery power and electronic control module includes a plug and play, USB connectible and disconnectible software module;
  the battery power and electronic control module has a connector disposed on the bottom that mates with the connector on the decoy base;
  the battery power and electronic control module further comprises a bottom base member for sealingly mating with and enclosing the decoy body cavity, and a battery holder connected to the base member; and
 whereby in use, the decoy base is placed in a selected position in a hunting environment by a user, the spinning wing decoy is coupled to the top of the decoy base, the decoy wings are coupled to the decoy body, and the power and control module is actuated to power and spin the wings.

2. The decoy set of claim 1, wherein the connector disposed at the top of the decoy base is a male type connector, and wherein the connector on the battery power and electronic control module is a female type connector.

3. The decoy set of claim 1, wherein the connector disposed at the top of the decoy base is a female type connector, and wherein the connector on the battery power and electronic control module is a male type connector.

4. The decoy set of claim 1, wherein the decoy body is constructed of ethylene vinyl acetate.

5. A powered spinning wing waterfowl or migratory bird decoy set comprising,
 a powered, spinning wing decoy; and
 a decoy base post adapted to be placed on an environmental surface, the decoy base adapted to hold the decoy in a predetermined position, the decoy being connectible and disconnectible from the decoy base, the decoy base including a vertical member, a connector disposed at the top of the decoy base;
 the decoy including,
  a decoy body constructed with exterior ornamentation to simulate a waterfowl or migratory bird, the decoy body being arranged in a predetermined orientation to simulate a waterfowl or migratory bird, the decoy body having a top, a bottom, and an interior cavity, the interior cavity being open at the bottom to form an access cavity port,
  a motor assembly configured to be disposed in the interior cavity of the decoy body, the motor assembly including a motor,
  a battery power and electronic control module, the battery power and electronic control module being connectible and disconnectible from the bottom of the decoy body at the access cavity port, the battery power and electronic control module including a battery communicatively connected to an electronic control circuit, the electronic control circuit further being communicatively connected to the motor assembly;
  the battery power and electronic control module includes a plug and play, USB connectible and disconnectible software module;
  the battery power and electronic control module has a connector disposed on the bottom, and wherein the decoy base has a connector that, in use, mates with the connector of the battery power and electronic control module;
  the battery power and electronic control module further comprises a bottom base member for sealingly mating with and enclosing the decoy body cavity, and a battery holder connected to the base member; and
  a pair of spinning decoy wings extending laterally from the decoy body, each decoy wing including a shaft for connection to the motor assembly and a wing panel which is constructed and arranged to simulate the wing of a waterfowl or migratory bird;
 whereby in use, the decoy base is placed in a selected position in a hunting environment by a user, the spinning wing decoy is coupled to the top of the decoy base, the decoy wings are coupled to the motor assembly through the body, and the power and control module is actuated to power and spin the wings.

6. The powered spinning wing waterfowl or migratory bird decoy set of claim 5, wherein the motor assembly is mounted to the body.

7. The powered spinning wing waterfowl or migratory bird decoy set of claim 5, wherein the motor assembly is mounted to the battery power and electronic control module.

* * * * *